United States Patent
Beery et al.

(10) Patent No.: US 10,634,492 B2
(45) Date of Patent: Apr. 28, 2020

(54) METHODS AND APPARATUS TO TRACK A BLADE

(71) Applicant: Deere & Company, Moline, IL (US)

(72) Inventors: Sara Meghan Beery, Seattle, WA (US); Tarik Loukili, Johnston, IA (US); Justin Borgstadt, West Des Moines, IA (US); Shayne C. Rich, Grimes, IA (US); Michio Kise, Bondurant, IA (US); Travis J. Davis, Polk City, IA (US)

(73) Assignee: Deere & Company, Moline, IL (US)

( * ) Notice: Subject to any disclaimer, the term of this patent is extended or adjusted under 35 U.S.C. 154(b) by 373 days.

(21) Appl. No.: 15/253,256

(22) Filed: Aug. 31, 2016

(65) Prior Publication Data

US 2018/0061040 A1    Mar. 1, 2018

(51) Int. Cl.
*G06T 7/70* (2017.01)
*G01C 9/06* (2006.01)
*H04N 7/18* (2006.01)
*E02F 9/26* (2006.01)
*E02F 3/76* (2006.01)
(Continued)

(52) U.S. Cl.
CPC .............. *G01C 9/06* (2013.01); *E02F 3/7636* (2013.01); *E02F 3/847* (2013.01); *E02F 9/264* (2013.01); *E02F 9/265* (2013.01); *G06T 7/70* (2017.01); *H04N 7/18* (2013.01); *E02F 9/2041* (2013.01); *G01C 11/06* (2013.01); *G06T 2207/30252* (2013.01)

(58) Field of Classification Search
CPC ........... G06T 7/004; G06T 2207/30252; E02F 3/7636; E02F 3/847; E02F 9/264; E02F 9/265; E02F 9/2041; G01C 9/06; G01C 11/06; H04N 7/18

USPC .......................................................... 348/135
See application file for complete search history.

(56) References Cited

U.S. PATENT DOCUMENTS 5,724,743 A * 3/1998 Jackson ............ G01B 11/2755
33/203.18
6,736,216 B2   5/2004 Savard et al.
(Continued)

FOREIGN PATENT DOCUMENTS

EP          2150772          5/2010

OTHER PUBLICATIONS

European Patent Office, "European Search Report," issued in connection with European Application No. 17188896.9, dated Jan. 15, 2018, 10 pages.
(Continued)

*Primary Examiner* — Ayman A Abaza
(74) *Attorney, Agent, or Firm* — Hanley, Flight & Zimmerman, LLC

(57) ABSTRACT

Methods and apparatus to track a blade are disclosed. A disclosed example apparatus includes a blade that is pivotable, first and second optical targets operatively coupled to the blade, and a first camera for collecting first imaging data of the first optical target within a first field of view. The example apparatus also includes a second camera for collecting second imaging data of the second optical target within a second field of view. The example apparatus also includes a selector to select at least one of the first or second imaging data, and a processor to determine an orientation of the blade based on the selected imaging data.

23 Claims, 14 Drawing Sheets

(51) Int. Cl.
*E02F 3/84* (2006.01)
*G01C 11/06* (2006.01)
*E02F 9/20* (2006.01)

(56) References Cited

U.S. PATENT DOCUMENTS

| | | | |
|---|---|---|---|
| 7,424,387 B1* | 9/2008 | Gill | G01B 11/272 |
| | | | 33/288 |
| 8,412,418 B2 | 4/2013 | Kumagai et al. | |
| 8,843,279 B2 | 9/2014 | Tafazoli Bilandi et al. | |
| 2003/0226290 A1 | 12/2003 | Savard et al. | |
| 2010/0121540 A1* | 5/2010 | Kumagai | E02F 3/7618 |
| | | | 701/50 |
| 2010/0231721 A1* | 9/2010 | Meloche | G08G 5/065 |
| | | | 348/159 |
| 2011/0169949 A1* | 7/2011 | McCain | E02F 3/847 |
| | | | 348/137 |
| 2012/0069178 A1 | 3/2012 | Nielsen et al. | |
| 2014/0277956 A1 | 9/2014 | Morin | |
| 2015/0106004 A1 | 4/2015 | Taylor et al. | |
| 2015/0178320 A1 | 6/2015 | Gao et al. | |
| 2015/0225923 A1 | 8/2015 | Wallace et al. | |

OTHER PUBLICATIONS

Gatrell et al., "Robust Image Features: Concentric Contrasting Circles and Their Image Extraction," Proceedings, SPIE—The International Society for Optical Engineering, vol. 1612, Nov. 12-14, 1991, 11 pages.

\* cited by examiner

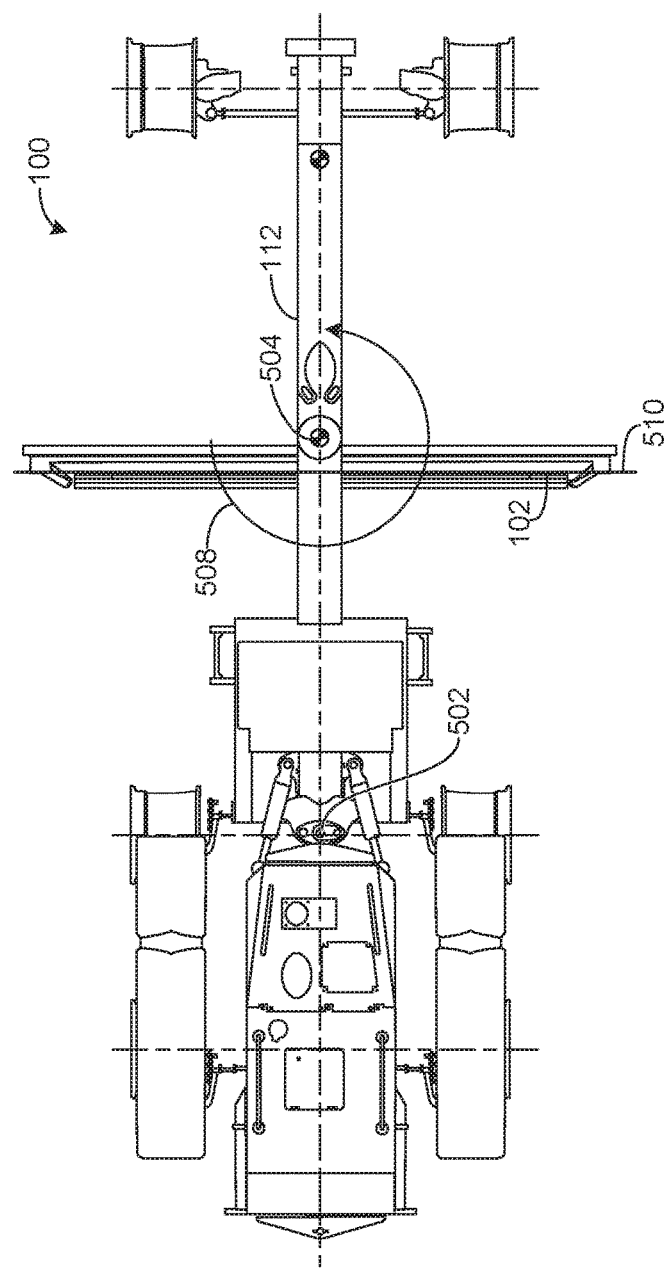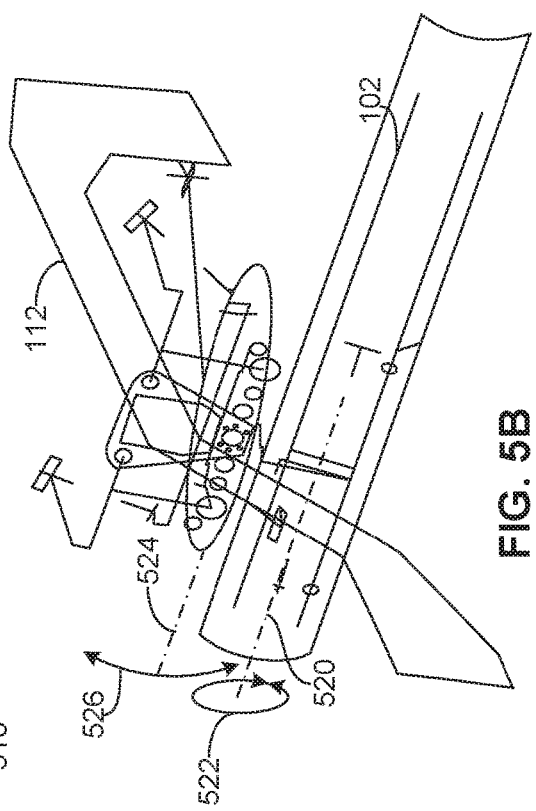
FIG. 5A
FIG. 5B

METHODS AND APPARATUS TO TRACK A BLADE

FIELD OF THE DISCLOSURE

This disclosure relates generally to working machines, and, more particularly, to methods and apparatus to track a blade.

BACKGROUND

In some known working machines (e.g., heavy equipment), a blade such as a motor grader blade may be used to grade and/or condition a ground. Some known blade tracking/monitoring systems use positional sensors and/or a global positioning system (GPS) to track a location and/or movement of a blade and/or a working edge of the blade such that positional measurements can be made within an order of a few millimeters (mm).

Some of these known imaging systems use vision systems to track a reticle or target of a working edge by obtaining images of the target and translating a vision system coordinate system to a navigation coordinate system that may be based on GPS. Some other known systems use laser guidance systems to track the working edge. These systems, however, may be limited in terms of reliability of positional/rotational determinations (e.g., dust and/or other environmental factors that may inhibit image recognition) and cameras of these systems may only be able to make visual measurements within a limited range of motion. Further, many of these known positional tracking systems can be relatively expensive.

BRIEF DESCRIPTION OF THE DRAWINGS

FIG. 5A is an overhead view of the example working machine of FIG. 1 that depicts an example centering coordinate system that may be used in the examples disclosed herein.

FIG. 5B illustrates an example home position of a blade of the example working machine of FIG. 1.

Figure 1:
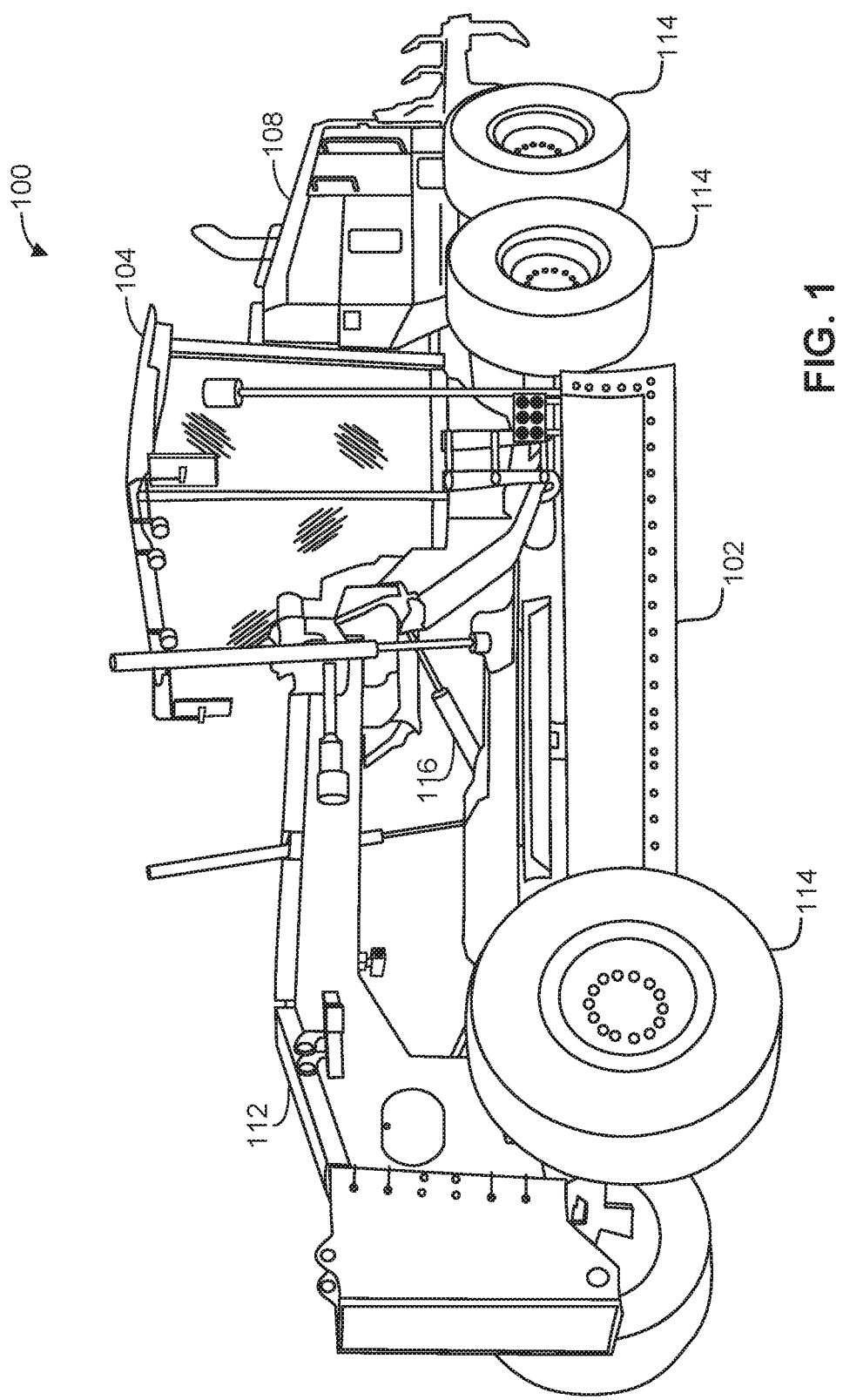
FIG. 1 illustrates a working machine in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

SUMMARY

An example apparatus includes a blade that is pivotable, first and second optical targets operatively coupled to the blade, and a first camera for collecting first imaging data of the first optical target within a first field of view. The example apparatus also includes a second camera for collecting second imaging data of the second optical target within a second field of view. The example apparatus also includes a selector to select at least one of the first or second imaging data, and a processor to determine an orientation of the blade based on the selected imaging data.

An example method includes visually measuring locations of first and second optical targets, where the first and second optical targets are operatively coupled to a blade that is pivotable, selecting visual location measurements of at least one of the first optical target or the second optical target, and determining a position and an orientation of the blade based on the selected visual location measurements.

An example tangible machine readable medium includes instructions, which when executed, cause a processor of a portable device to at least select a visual location measurement of at least one of a first optical target or a second optical target, where the first and second optical targets are operatively coupled to a blade that is pivotable, and determine a visual position of the blade based on the selected visual location measurement.

An example vehicle includes a working implement that is pivotable and movable in multiple degrees of freedom, and an optical target operatively coupled to the working implement, where the optical target includes an array of a plurality of circles arranged in a pattern. The example vehicle also includes a camera for collecting imaging data of the optical target, and a processor to determine a position and an orientation of the working implement based on the imaging data.

DETAILED DESCRIPTION

Methods and apparatus to track blades are disclosed herein. In some known working machines (e.g., heavy equipment such as bulldozers, motor graders, etc.), a blade, such as a motor grader blade or other working implement, may be used to grade and/or condition a work surface, work site and/or Earth. Some known blade tracking/monitoring systems use positional sensors and/or a global positioning system (GPS) to track a location and/or movement of a blade that can measure movement of the blade within approximately 30 millimeters (mm). Laser guidance systems have also been used to track blade movement. However, these known laser and GPS systems can be relatively expensive and complex (e.g., requiring numerous different integrated systems such as power systems, GPS systems, coordinating software, etc.).

Some other known image tracking systems use cameras to track a reticle or target of a pivotable and translatable working edge by obtaining images of the target and translate a vision system coordinate system to a navigation coordinate system that is based on GPS. These image tracking systems, however, may be limited in terms of reliability of position determinations (e.g., dust and/or other environmental factors may inhibit image recognition) and cameras of these systems may only be able to make visual measurements within a limited range of motion. In particular, these known systems may not be able to track movement in one or more degrees of freedom of a blade.

The examples disclosed herein enable a cost-effective method of accurately determining a position of a working blade, which can be moved, pivoted, rotated and/or translated in multiple degrees of freedom (e.g., seven degrees of freedom). In particular, the examples disclosed herein utilize imaging systems (e.g., camera systems) in combination with optical targets that are mounted and/or coupled to the working blade to monitor and/or measure/track the position and/or rotational movement of the blade. In some examples, visual data/information corresponding to an optical target of a plurality of optical targets is selected from amongst multiple optical targets to determine a position and rotation of a working blade. In particular, an optical target within a visual range of a camera may be selected and visually measured/analyzed to determine a position and rotation of the working blade. The examples disclosed herein may enable a measured accuracy on the order of 1 mm or less.

FIG. 1 illustrates a working machine 100 in which the examples disclosed herein may be implemented. The working machine 100 of the illustrated example, which is depicted as a motor grader in this example, includes a working blade 102, a cab 104, an engine portion 108, a pivot portion (e.g., a steering portion) 112 and wheels 114. The example working blade 102 can pivot and displace relative to the pivot portion 112 in multiple degrees of freedom. In this example, the blade 102 moved/rotated via an actuator 116.

To control a grade (e.g., a slope along at least one direction) of ground of a work site (e.g., a work zone) based on a grading plan, an operator of the illustrated example directs the working machine 100 from the cab 104 and as the working machine 100 is moved along the work site, the blade 102 is positioned and rotated appropriately to affect at least one condition of the ground. In particular, the blade 102 is moved/pivoted by the actuator 116 against the ground to shape and/or re-shape the ground (e.g., grade the ground). As the working machine 100 moves along the work site, the pivot portion 112 rotates to steer the working machine 100 while the engine portion 108 propels the working machine 100 in a forward or reverse direction. As the working machine 100 moves, the blade 102 is controlled (e.g., actuated) in numerous positions (e.g., downward and upward) as well as rotational directions (e.g., relative to the front portion 112, relative to the ground, etc.). Because grading the ground may be vital to construction, it may be necessary to control the blade 102 within a few millimeters (e.g., to at least within 30 millimeters) in some applications.

While the example working machine 100 is shown as a motor grader in this example, the working machine 100 may be any appropriate vehicle and/or heavy equipment including, but not limited to, bull dozers, harvesters, back hoes, excavators, loaders, compactors, conveyors and/or agricultural equipment, etc. While the blade 102 is described in the illustrated example, any of the examples disclosed herein may be applied to any appropriate working implement.

Figure 2:
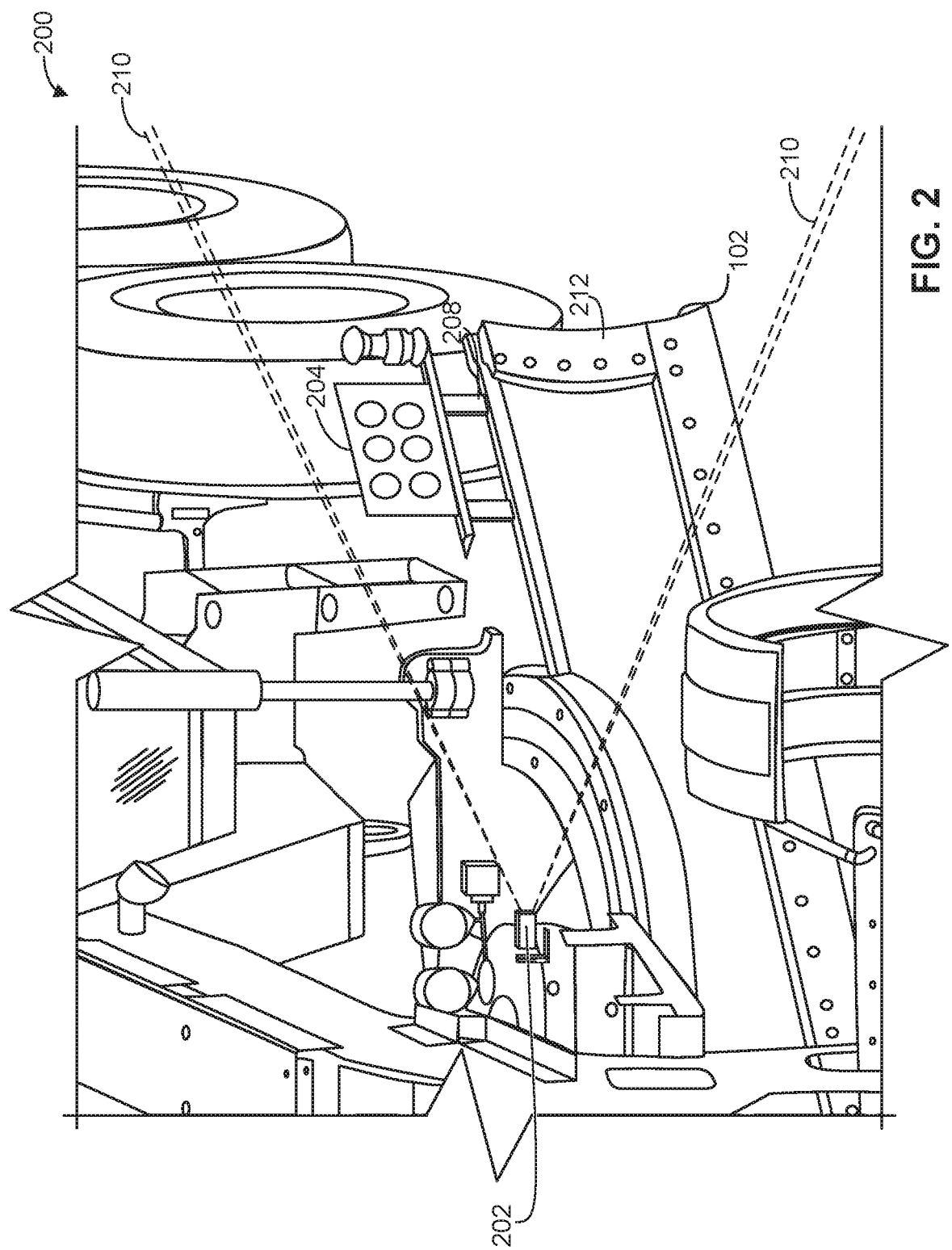
FIG. 2 is an example displacement monitoring system in accordance with the teachings of this disclosure.

FIG. 2 is an example displacement monitoring system 200 in accordance with the teachings of this disclosure. As can be seen in the illustrated example of FIG. 2, the displacement monitoring system 200 includes a camera 202 (also shown/depicted as cameras 202a, 202b, etc. in subsequent figures) and an optical target 204, which is operatively and/or mechanically coupled to the blade 102. In some examples, the camera 202 may be an IDS gigE UEye Re camera (UI-5490RE) with Computaar 8 mm 1:1.4 2/3 lens. However, any appropriate camera/lens combination may be used. In this example, the blade 102 is supported by a support (e.g., a coupling support) 208 and shown rotated away from a default centered home position, which is described below in connection with FIGS. 5A and 5B. The camera 202 of the illustrated example defines a corresponding field of view, as generally indicated by lines 210. In some examples, the camera 202 has an approximate angular viewing range of approximately 50 degrees. However, any appropriate angular viewing range angle may be used based on a specific application/use.

To determine a displacement and/or rotation of the blade 102, the camera 202 of the illustrated example monitors and/or visually/optically measures the optical target 204, as will be discussed in greater detail below in connection with FIGS. 3-12. However, because the example blade 102 of the illustrated example is able to pivot away from the respective field of view of the camera 202, it can be desirable and/or advantageous to measure the blade 102 at another camera and/or camera position from that shown in FIG. 2 when the blade 102 has moved/rotated out of a visual range and/or a desired visual range. In this example, the relative positioning of the optical target 204 to the blade 102 allows detection of the optical target 204 even when the blade 102 moves towards the front tires 114. Further, an outer edge (e.g., an outer lateral edge) 212 and/or distal end portion of the blade 102 may more accurately indicate a position and/or rotation of the blade 102 than measuring a portion of the blade 102 closer to its respective pivot (e.g., a center of the blade 102, a pivoting center, etc.) due to a larger relative movement of the blade 102 at the distal end portion. The examples disclosed herein enable monitoring of displacement as well as rotation of the blade 102 even when the blade 102 along with the optical target 204 has moved out of a visual detection/measurement range of the camera 202 shown in FIG. 2 without costly positional detection systems (e.g., laser-based systems). The examples disclosed herein also enable measurement of point(s) and/or visual identifiers proximate the outer edge 212 of the blade 102.

Figure 3:
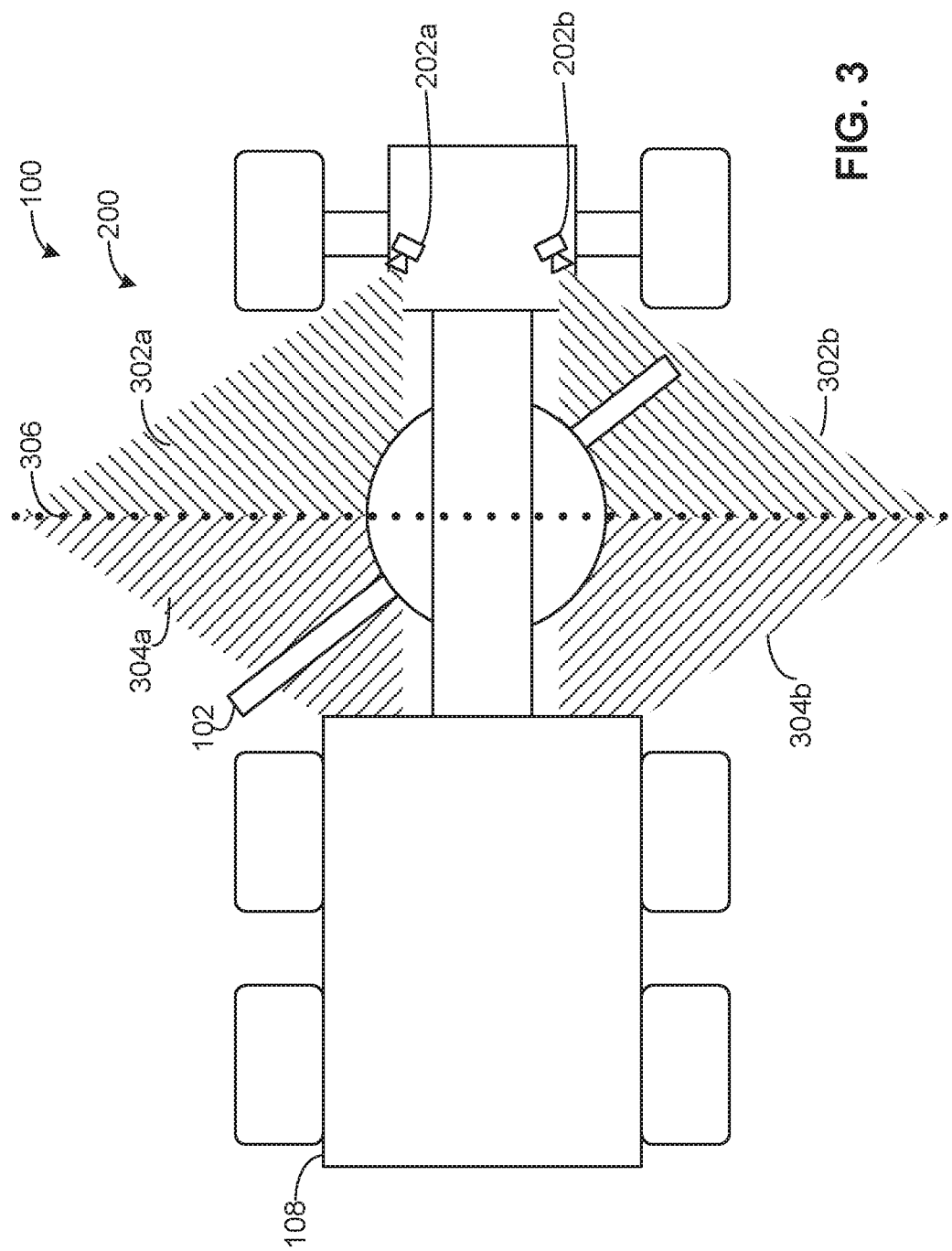
FIG. 3 is a simplified overhead view depicting camera detection ranges of the example displacement monitoring system of FIG. 2.

FIG. 3 is a simplified overhead view depicting camera detection ranges of the example displacement monitoring system 200 of FIG. 2. As can be seen in the illustrated example of FIG. 3, a camera 202a has a corresponding first field of view (e.g., visual range) 302a and a first non-detection area 304a in which the camera 202a cannot detect and/or accurately detect the optical target 204. Likewise, the camera 202b has a corresponding second field of view 302b and a second non-detection area 304b. In this example, the first field of view 302a is separated from the first non-detection area 304a by a center line 306. Likewise, the second field of view 302b is also separated from the second non-detection area 304b by the center line 306.

To prevent an interruption in detecting a displacement and/or angular rotation of the blade 102, the displacement monitoring system 200 of the illustrated example captures data from the camera 202a or the camera 202b when a portion of the blade 102 (e.g., a portion that extends beyond an axis of rotation of the blade 120) is rotated within either the first field of view 302a or the second field of view 302b. In other words, the example displacement monitoring system 200 switches between using and/or acquiring data from the camera 202a or the camera 202b based on an ability of the respective camera 202a or the camera 202b to properly/accurately detect the respective optical target 204. As a result, at least one of the cameras 202a, 202b can measure a position and rotation of the blade 102 when the other of the cameras 202a, 202b cannot detect its respective optical target 204. In this example, both of the cameras 202a, 202b are able to detect their respective optical target 204 when the blade 102 is positioned at the center line 306. In other words, the cameras 202a, 202b have an overlap visual detection range in this example. Additionally, or alternatively, in some examples, image data to determine the position/rotation of the blade 102 is combined/fused by the displacement monitoring system 200 from both of the cameras 202a, 202b. In such examples, confidence estimates (e.g., confidence metrics) corresponding to each of the cameras 202a, 202b can be used to determine whether to continue obtaining data (e.g., image and/or estimated locational data) from one of or both of the cameras 202a, 202b.

While two cameras are shown in the illustrated example of FIG. 3, any appropriate number of cameras may be used as appropriate (e.g., 3, 4, 5 . . . etc.). For example, additional cameras may be placed towards a rear portion of the working machine 100 such as the engine portion 108 (e.g., on an opposite side of the working machine 100 from the cameras 202a, 202b) to cover the non-detection areas (e.g., blind spots) 304a, 304b. In some examples, any of the visual ranges 302a, 302b may be altered and/or revised based on a detected articulation/relative displacement of the working machine 100 and/or a portion of the working machine 100.

Figure 4:
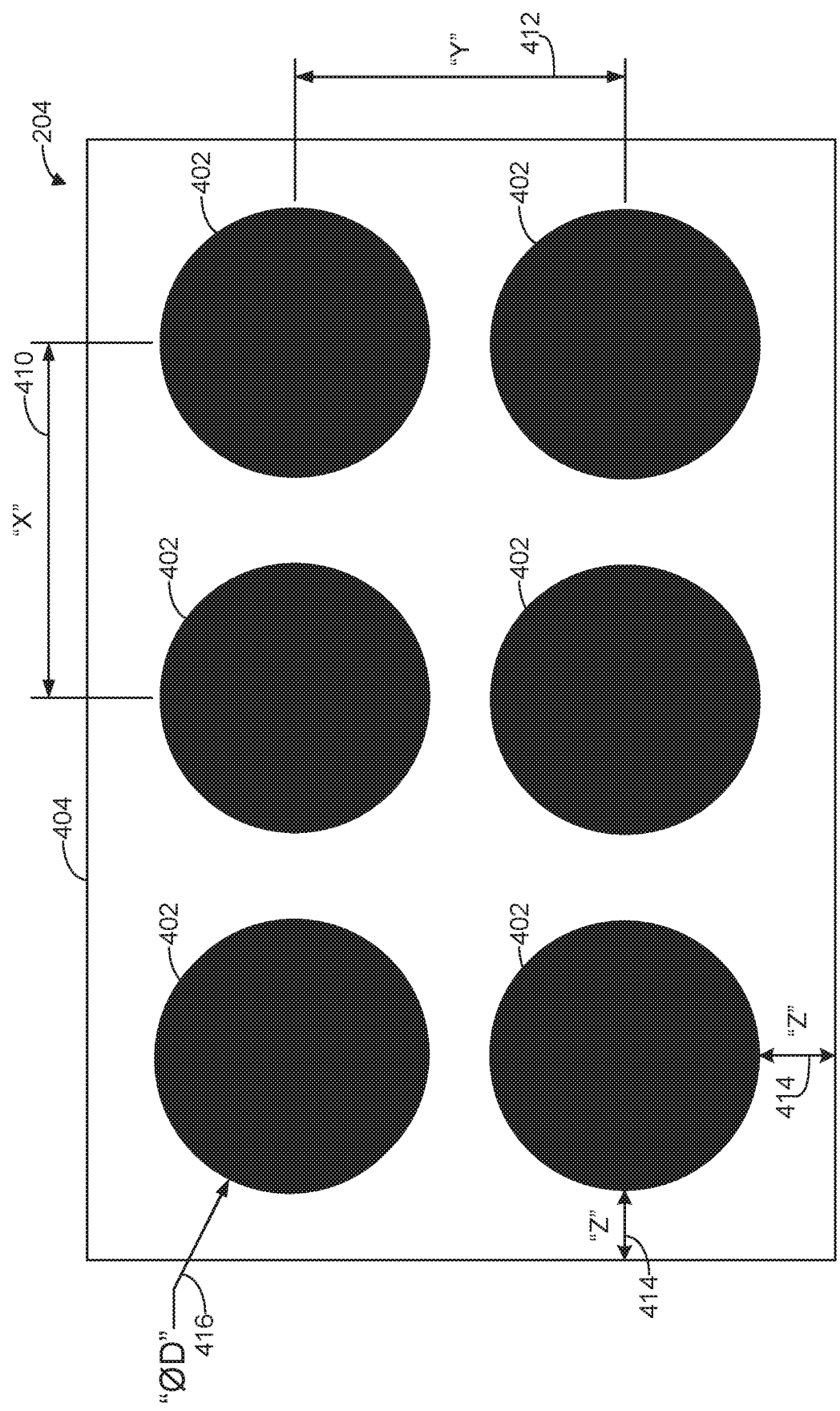
FIG. 4 is a front view illustrating an example optical target of the example displacement monitoring system of FIG. 2.

FIG. 4 is a front view illustrating the example optical target 204 of the example displacement monitoring system 200 of FIG. 2. In this example, the optical target 204 includes an array of circular targets 402 and is defined by a generally rectangular border 404. In this example, two rows of the three circular targets 402 are used to calculate a position of the blade 102. In particular, the circular targets 402 have a relatively dark color (e.g., black) while a background surrounding the circular targets 402 has a relatively light color (e.g., white, gray, off-white, etc.) to provide a significant contrast that can be easily detected by cameras in dusty and/or obscured conditions, for example.

According to the illustrated example, the circular targets 402 are flat-bed printed onto a magnetic sheet that is then affixed to a steel plate. In turn, the steel plate is held to the blade 102 by heavy-capacity magnets at four points, for example. In some examples, a size and location of the circular targets 402 is improved and/or optimized for positional detection based on a two variable optimization that increases and/or maximizes both an area of the circular targets 402 as well as a distance between the circular targets 402 based on a specific application and/or desired use.

In this example, the optical target 204 is approximately 15 inches (") wide by 10" tall. Dimensions 410 and 412, which are denoted by "X" and Y," respectively, are approximately 4.75" while dimensions 414, denoted by "Z," are approximately 1". Further, diameter 416, which is denoted by "φD," is approximately 3.5". The dimensions described in this example are only examples and any appropriate dimensions and/or size ratios may be used according to application, component size(s), visibility, etc.

While a total of six circular targets 402 are shown, any appropriate number or arrangement of the circular targets 402 may be used. While the circular targets 402 are shown with a darker color, in some examples, the background is a darker color than the circular targets 402 (e.g., a black background with white or gray circular targets 402, etc.). In other examples, the circular targets may not have a significantly different color from the background (e.g., only a line segment defines each of the circular targets 402). While the circular targets 402 are round and/or ellipsoid in this example, the circular targets 402 may be any appropriate shape (e.g., a triangular shape, a square shape, a pentagon shape or any appropriate polygon shape). In some examples, the array of circular targets 402 may be directly provided and/or printed onto the blade 102 (e.g., without assembling a part/assembly). In some examples, the optical target 204 is disposed on (e.g., directly printed on) a contour (e.g., a non-flat surface) of the blade 102. In some examples, the optical target 204 is engraved onto the blade 102.

FIG. 5A is an overhead view of the example working machine 100 of FIG. 1 that depicts an example centering coordinate reference system that may be used in the examples disclosed herein. In this example, the blade 102 is shown in a default/centered position (e.g., a home position). According to the illustrated example, a displacement, which encompasses translation as well as rotation, of the blade 102 is calculated/translated into a vehicle coordinate system, which is depicted in FIG. 5A as a vehicle coordinate system origin 502. The example vehicle coordinate system origin 502 represents an assumed coordinate system origin in three dimensions. FIG. 5A also depicts a rotational pivot point 504 of the blade 102, in which the blade 102 may rotate about, as generally indicated by an arrow 508. The rotational pivot 504 is located on the front portion 112 of the working machine 100. In the illustrated view of FIG. 5A, the blade 102 is centered at its default position, as indicated by a line 510. In some examples, the vehicle coordinate system origin 502 is used in conjunction with a navigation system (e.g., a GPS system) to relate a movement of the blade 102 as the blade 102 is actuated during grading, for example.

FIG. 5B is an isometric partial view further illustrating the example default centered position of the blade 102 of the example working machine 100 of FIG. 1 in additional degrees of freedom of movement from that shown in FIG. 5A. As can be seen in the illustrated example of FIG. 5B, a second pivot axis 520 defines yet another rotational movement, as generally indicated by an arrow 522. Similarly, a third pivot axis 524 defines another rotational movement (e.g., a downward and upward tilt), as generally indicated by an arrow 526.

To calibrate a relative position of the camera 202, a calibration target such as a landmarks on the working machine 100 or a target mounted on the working machine with a known location and orientation in a machine coordinate system (e.g., the vehicle coordinate system origin 502). In such examples, the camera 202 will detect this known target and use the target to generate and/or store a camera-to-machine transformation matrix.

To rectify the images for optical distortion and/or sensor/lens misalignment (also described below in connection with FIG. 12, block 1204), camera parameters of the illustrated example are generated using a toolbox of a calibration module that takes multiple camera images of a planar checkerboard and computes the internal camera parameters such as focal length, principal point, skew coefficients, and/or distortions.

These computed parameters determine the relationship between the true pixel locations in the image frame, which is the projection of the points in the camera frame onto a two-dimensional "x-y" plane with an origin located at the top right corner of the image and corresponding distorted locations in the image. This relationship is defined by Equation 1 below:

$$\begin{pmatrix} x_c \\ y_c \\ 1 \end{pmatrix} = KK \begin{pmatrix} x_i \\ y_i \\ 1 \end{pmatrix}, \quad (1)$$

where KK is the camera matrix defined as:

$$KK = \begin{pmatrix} x_f & \alpha * x_f & x_p \\ 0 & y_f & y_p \\ 0 & 0 & 1 \end{pmatrix}, \quad (2)$$

and where $(x_p, y_p)$ is the principle point, the origin of the camera frame in the image frame, $(x_f, y_f)$ is the focal length of the camera in pixels, a is the skew coefficient, or the angle between the x and y image frame axes. The skew coefficient is approximately zero if the pixels are rectangular Further, $(x_c, y_c)$ represent the "true" pixel coordinates, and $(x_i, y_i)$ represent the distorted image pixel coordinates.

This aforementioned relationship is used to "undistort" the image by calculating the true location in the image frame of each pixel. The toolbox computes these parameters using a pinhole model of a camera is shown in Equation 3:

$$s \begin{pmatrix} x_i \\ y_i \\ 1 \end{pmatrix} = KK(R \mid t) \begin{pmatrix} x_w \\ y_w \\ z_w \\ 1 \end{pmatrix}, \quad (3)$$

where s is an arbitrary scale factor, $(x_w, y_w, z_w)$ are the three dimensional world coordinates of a point, R is the three dimensional rotation of the camera relative to the world frame, and t is the 3×1 translation of the camera relative to a world frame/reference.

According to the illustrated example the extrinsic parameters are computed for each image of the checkerboard. In this example, the target reference frame is centered at the upper left-hand corner of the optical target 204. The intrinsic parameters may be focal length, principal point, skew coefficients, and/or distortions.

Next the aforementioned example toolbox receives all the computed parameters and utilizes these parameters to estimate the true value of the parameters, including distortion, using a nonlinear least-squares minimization of the estimation error. The toolbox of the illustrated example then improves (e.g., optimizes) the parameters using the solutions from each checkerboard, and provides the final computed intrinsic parameters and the standard estimation errors.

Figure 6:
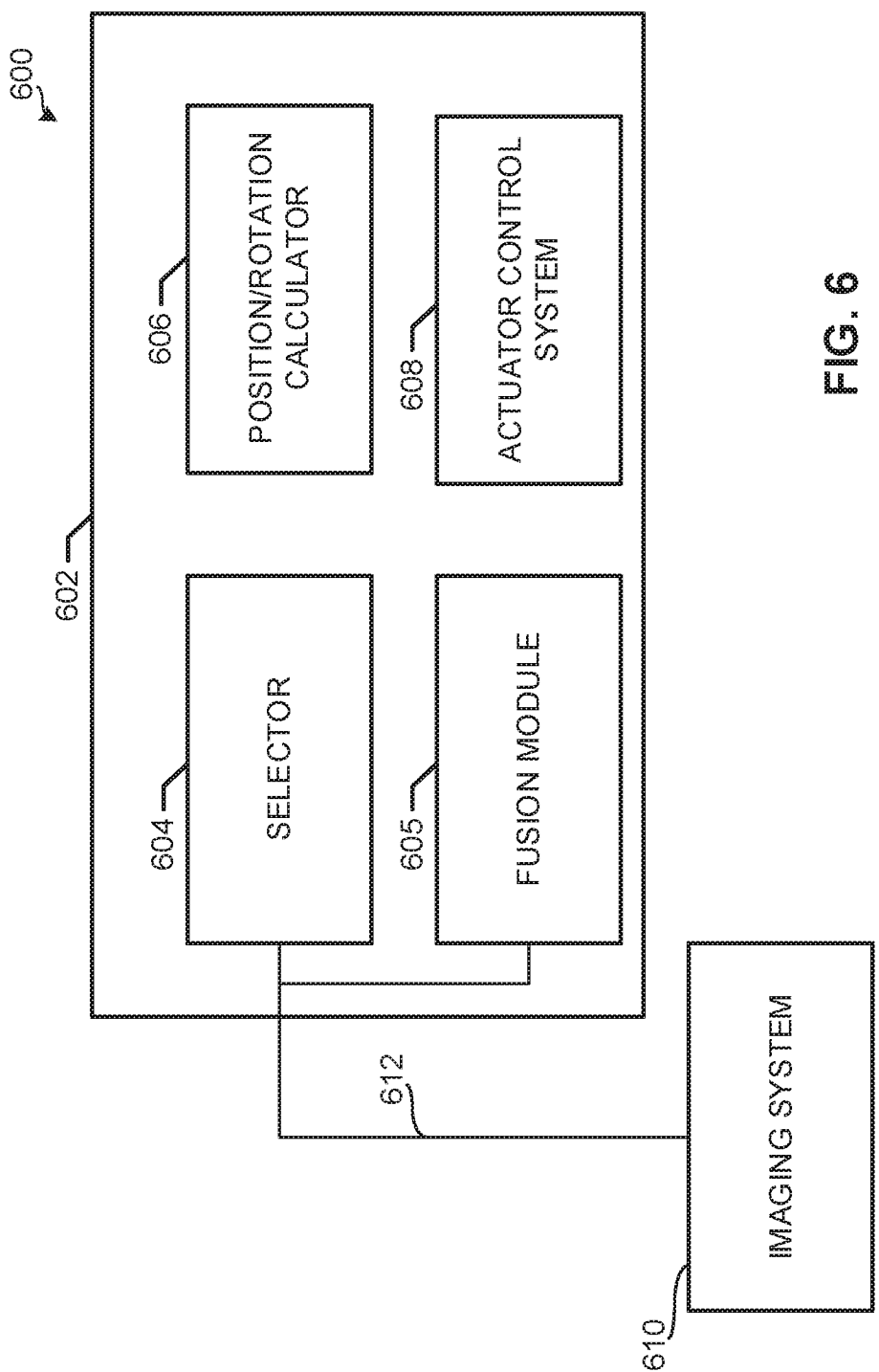
FIG. 6 is an example displacement detection analysis system that may be used to implement the example disclosed herein.

FIG. 6 is an example displacement detection analysis system 600 that may be used to implement the example disclosed herein. In particular, the system 600 may incorporate and/or be implemented by the example architecture 700 or the example architecture 800 described below in connection with FIGS. 7 and 8, respectively. The example detection analysis system 600 includes a tracking engine 602, which includes a selector 604, a fusion module 605, a position/rotation calculator 606 and an actuator control system 608. In this example, the tracking engine 602 is communicatively coupled to an imaging system 610 via a communication line 612.

In operation, the tracking engine 602 determines and/or calculates a position as well as a rotation of the blade 102 while the working machine 100 is in operation. According to the illustrated example, the selector 604 receives image data from multiple cameras/imaging sensors of the imaging system 610 and selects the image data and/or corresponding positional/rotational data of the blade 102 to be used for determining the position and the orientation of the blade 102. In this example, the selector 604 utilizes a confidence index/metric of each camera of the imaging system 610 to select the camera data to be used in determining the position and/or rotation of the blade 102. In some examples, the confidence index/metric reflects a quality of the detection and tracking of the target by the camera, segmentation, quality of shapes of the target, a check that the target has a proper number of shapes (e.g., six circles of a shape array), verification of a geometrical relationship in space and/or tracking in a previous frame (image) to verify a difference between measured and predicted shape locations of the current frame (image) does not exceed a threshold (e.g., a frame-to-frame shape differential threshold).

The position/rotation calculator 606 of the illustrated example is used to calculate the position and rotation of the blade 102 based on the image data. This process is described in greater detail below in connection with FIGS. 9-12. In this example, the position/rotation calculator 606 utilizes images of the respective optical targets 204 to calculate translation as well as orientation of the blade 102 in multiple degrees of freedom.

In some examples, the fusion module 605 is used to combine image data and/or resultant position/orientation estimates of the optical targets 202 from multiple cameras. In particular, the fusion module 605 may estimate an orientation and/or position of the blade 102 from analyzing image data from multiple cameras. In some examples, the fusion module 605 is integral with the selector 604.

According to the illustrated example, the actuator control system 608 controls movement of the blade 102 (e.g., both rotation and displacement along multiple degrees of freedom) as the working machine 100 moves along a work site, for example. In particular, the actuator control system 608 controls movement of the blade 102 to alter a landscape of the worksite without the need for manual control/input by an operator. The example actuator control system 608 may take into account measured ground conditions, ground data and/or GPS positional data to control the blade 102.

The example imaging system 610 includes numerous cameras or other optical sensors used to determine the translation and orientation of the optical target 204 and, in turn, the blade 102. In this example, the imaging system 610 generates and forwards image data from both cameras 202a, 202b while the example selector 604 selects the pertinent image data so that the position/rotation calculator 606 may determine/calculate the position/rotation of the blade 102 while excluding (e.g., ignoring) data from an other (i.e., an unselected) of the cameras 202a, 202b, for example.

Figure 7:
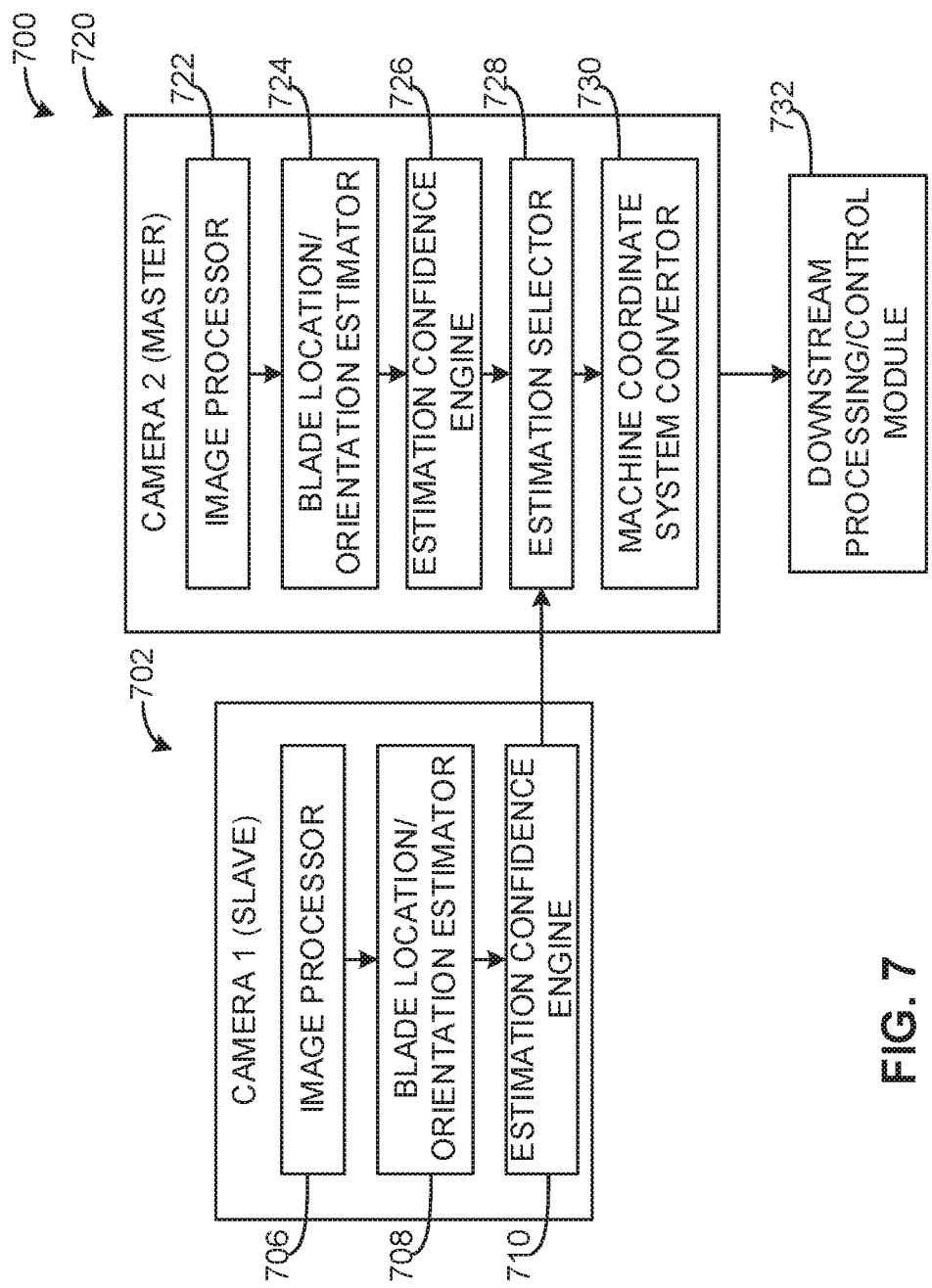
FIG. 7 is a schematic overview of an example architecture that may be used to implement the example displacement detection analysis system of FIG. 6.

FIG. 7 is a schematic overview of an example architecture (e.g., an image processing/selecting architecture) 700 that may be used to implement the example displacement detection analysis system 600 of FIG. 6. In this example, the architecture 700 includes a first camera 702, which is designated as a "slave" in this example and includes an image processor 706, a blade location orientation estimator 708 and an estimation confidence engine 710. The example architecture 700 also includes a second camera 720, which is designated as a "master" in this example and includes an image processor 722, a blade location/orientation estimator 724, an estimation confidence engine 726, an estimation selector 728 and a machine coordinate system convertor 730. In this example, the second camera 720 is communicatively coupled to a downstream processing/control module 732 in addition to the first camera 702.

In operation, both of the image processors 706, 722 receive image data and/or images from respective cameras and, in turn, provide the image data to the blade location estimators 708, 724, respectively. The blade location estimators 708, 724 of the illustrated example utilize this received image data to calculate/determine a displacement/location and orientation (e.g., in multiple degrees of freedom) of the blade 102. Examples of determinations of the displacement/translation and the orientation are described below in greater detail in connection with FIGS. 9-12. After determining the displacement and the orientation of the blade 102, the blade location estimators 708, 724 provide their respective calculated displacement/translation and orientation to the estimation confidence engines 710, 726, respectively, to determine the displacement and orientation of the blade 102. According to the illustrated example, the estimation selector 728 then selects which calculated displacement/location and orientation to indicate movement/tracking of the blade 102. In particular, the estimation selector 728 of the illustrated example compares estimation confidences between both of the cameras 702, 720 to select which respective image data and/or corresponding blade location/orientation estimate to be used to track (e.g., periodically track) the blade 102.

In some examples, the downstream processing unit 732 determines/calculates the movement of the blade and/or estimation confidences (e.g., confidence factors). Alternatively, in some examples, the first camera 602 does not provide an estimated displacement or orientation of the blade 102 and, instead, the blade location/orientation estimator 724 calculates the displacement and/or orientation of the blade 102.

Figure 8:
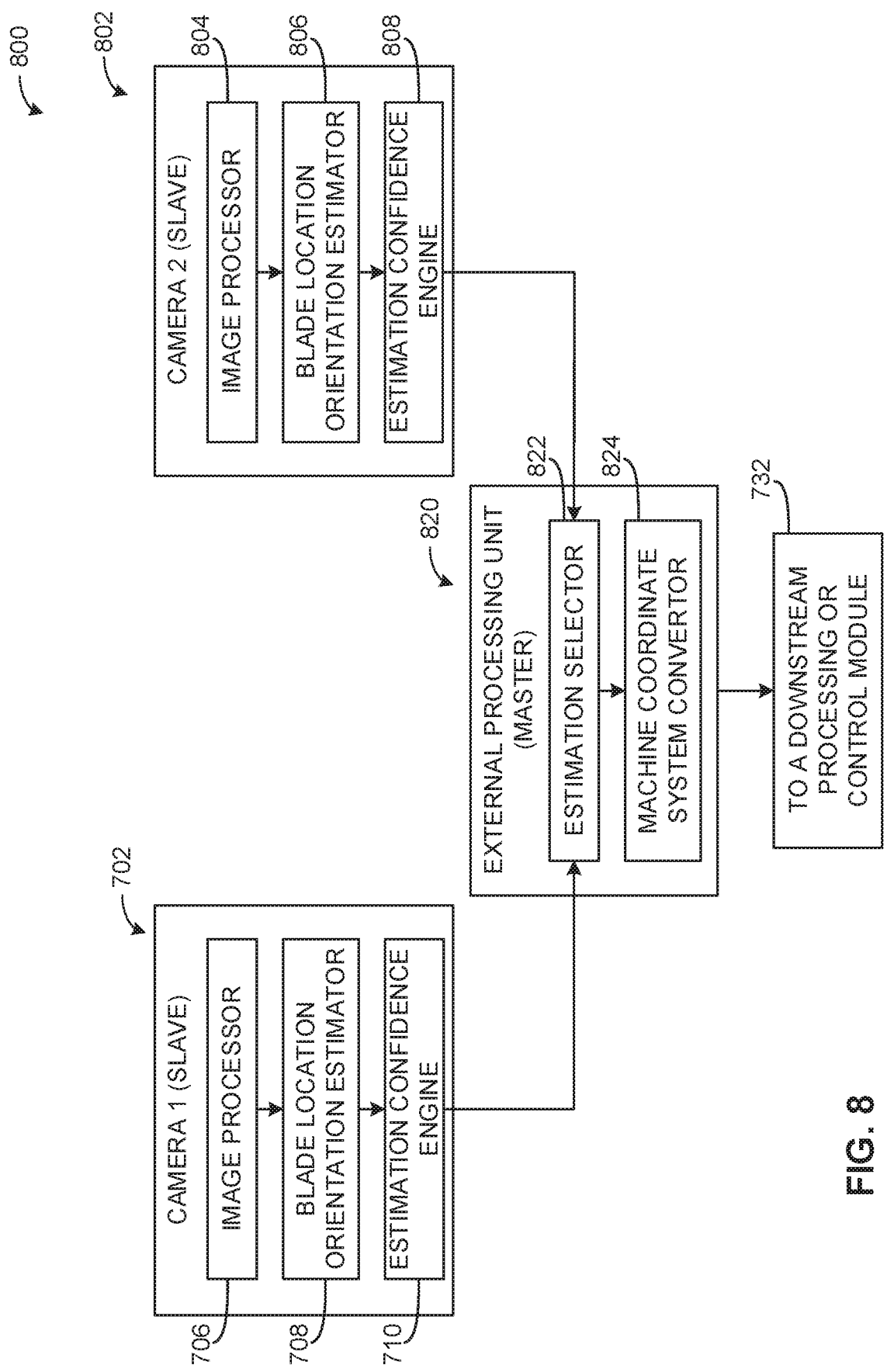
FIG. 8 is a schematic overview of an alternative example architecture that may be used to implement the example displacement detection analysis system of FIG. 6.

FIG. 8 is a schematic overview of an alternative example architecture 800 that may be used to implement the example displacement detection analysis system 600 of FIG. 6. In contrast to the example architecture 700 of FIG. 7, the architecture 800 of the illustrated example includes multiple cameras in a "slave" configuration. In particular, the example architecture 800 includes the first camera 702 of FIG. 7 as well as a second camera 802, which includes an image processor 804, a blade location orientation estimator 806 and an estimation confidence engine 808.

Instead of utilizing the second camera 802 to process/select visual data for location/orientation determinations, as is done with the second camera 720 of FIG. 7, the architecture 800 of the illustrated example, instead, includes an external processing unit (e.g., an external visual data processing unit) 820, which includes an estimation selector 822 and a machine coordinate system converter 824. In this example, the external processing unit 820 is communicatively coupled to the aforementioned downstream processing/control module 732. Further, the example estimator selector 822 is communicatively coupled to both the estimation confidence engine 710 and the estimation confidence engine 808. In some examples, the estimation selector 822 and/or the fusion module 605 continuously receives and/or processes visual data from multiple cameras and fuses and/or combines the data from the multiple cameras to be used in a determination of the orientation and/or position of the blade 102.

According to the illustrated example, the estimation selector 822 of the external processing unit 820 selects the visual data and/or respective blade location/orientation estimate calculated from image data received from either of the cameras 702, 802 (e.g., from the blade location estimator 708 or the blade location estimator 806) that is to be used in determining/calculating the position and/or rotation of the blade 102. In a similar manner to the architecture 700, the machine coordinate system convertor converts the image data to a position and/or rotation of the blade 102 in the coordinate system origin 502 and conveys the calculated data to the downstream processing/control module 732.

While an example manner of implementing the displacement detection analysis system 600 of FIG. 6 is illustrated in FIGS. 7-12, one or more of the elements, processes and/or devices illustrated in FIGS. 7-12 may be combined, divided, re-arranged, omitted, eliminated and/or implemented in any other way. Further, the example tracking engine 602, the example selector 604, the example fusion module 605, the example position/rotation calculator 606, the example actuator system 608, the example imaging system 610, and/or, more generally, the example displacement detection analysis system 600 of FIG. 6 may be implemented by hardware, software, firmware and/or any combination of hardware, software and/or firmware. Thus, for example, any of the example tracking engine 602, the example selector 604, the example fusion module 605, the example position/rotation calculator 606, the example actuator system 608, the example imaging system 610 and/or, more generally, the example displacement detection analysis system 600 could be implemented by one or more analog or digital circuit(s), logic circuits, programmable processor(s), application specific integrated circuit(s) (ASIC(s)), programmable logic device(s) (PLD(s)), System on Chip (SOC) and/or field programmable logic device(s) (FPLD(s)). When reading any of the apparatus or system claims of this patent to cover a purely software and/or firmware implementation, at least one of the example tracking engine 602, the example selector 604, the example fusion module 605, the example position/rotation calculator 606, the example actuator system 608 and/or the example imaging system 610 is/are hereby expressly defined to include a tangible computer readable storage device or storage disk such as a memory, a digital versatile disk (DVD), a compact disk (CD), a Blu-ray disk, etc. storing the software and/or firmware. Further still, the example displacement detection analysis system 600 of FIG. 6 may include one or more elements, processes and/or devices in addition to, or instead of, those illustrated in FIGS. 7-12, and/or may include more than one of any or all of the illustrated elements, processes and devices.

Flowcharts representative of example machine readable instructions for implementing the displacement detection analysis system 600 of FIG. 6 is shown in FIGS. 9-12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 9-12, many other methods of implementing the example displacement detection analysis system 600 may alternatively be used. For example, the order of execution of the blocks may be changed, and/or some of the blocks described may be changed, eliminated, or combined.

As mentioned above, the example processes of FIGS. 9-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
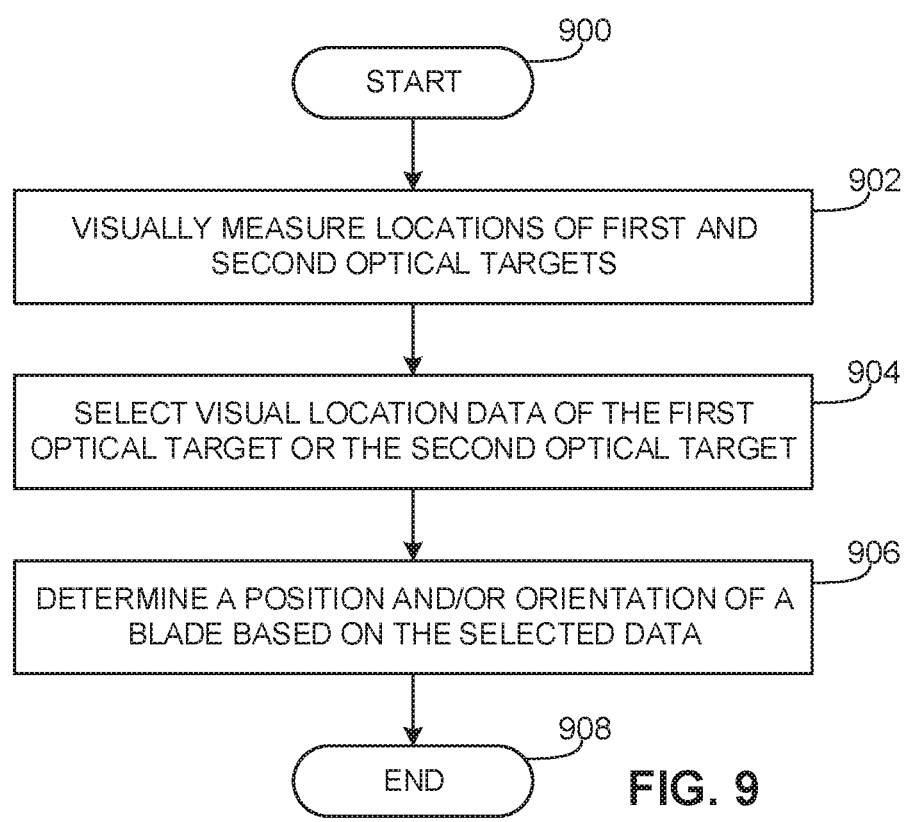
FIG. 9 is a flowchart representative of an example method to analyze optical targets, which may be implemented in the examples disclosed herein.

The example method of FIG. 9 begins at block 900 in which the working machine 100 is being operated (block 900). To control the blade 102 so that ground in a work site can be graded, a position as well as an orientation (e.g., an orientation in multiple directions and/or degrees of freedom) of the blade 102 is to be determined to appropriately control the blade 102 via the actuator.

First and second optical targets (e.g., the optical targets 204) are visually measured/captured by the imaging system 610 (block 902). In particular, an array of shapes of the first and second optical targets are captured by a respective camera (e.g., the cameras 202a, 202b).

According to the illustrated example, visual location data is selected based on the visual measurements and/or associated confidence indexes (block 904). In this example, the visual location measurements are selected based on a confidence indexes corresponding to respective cameras. In such examples, the visual location measurements are selected by the example selector 604 from the respective camera with the highest corresponding confidence index.

Next, the position and/or orientation of the blade 102 is determined based on the selected visual location data (block 906) and the process ends (block 908). Such example determinations of the position and/or orientation of the blade 102 are described below in greater detail in connection with FIGS. 11 and 12.

Figure 10:
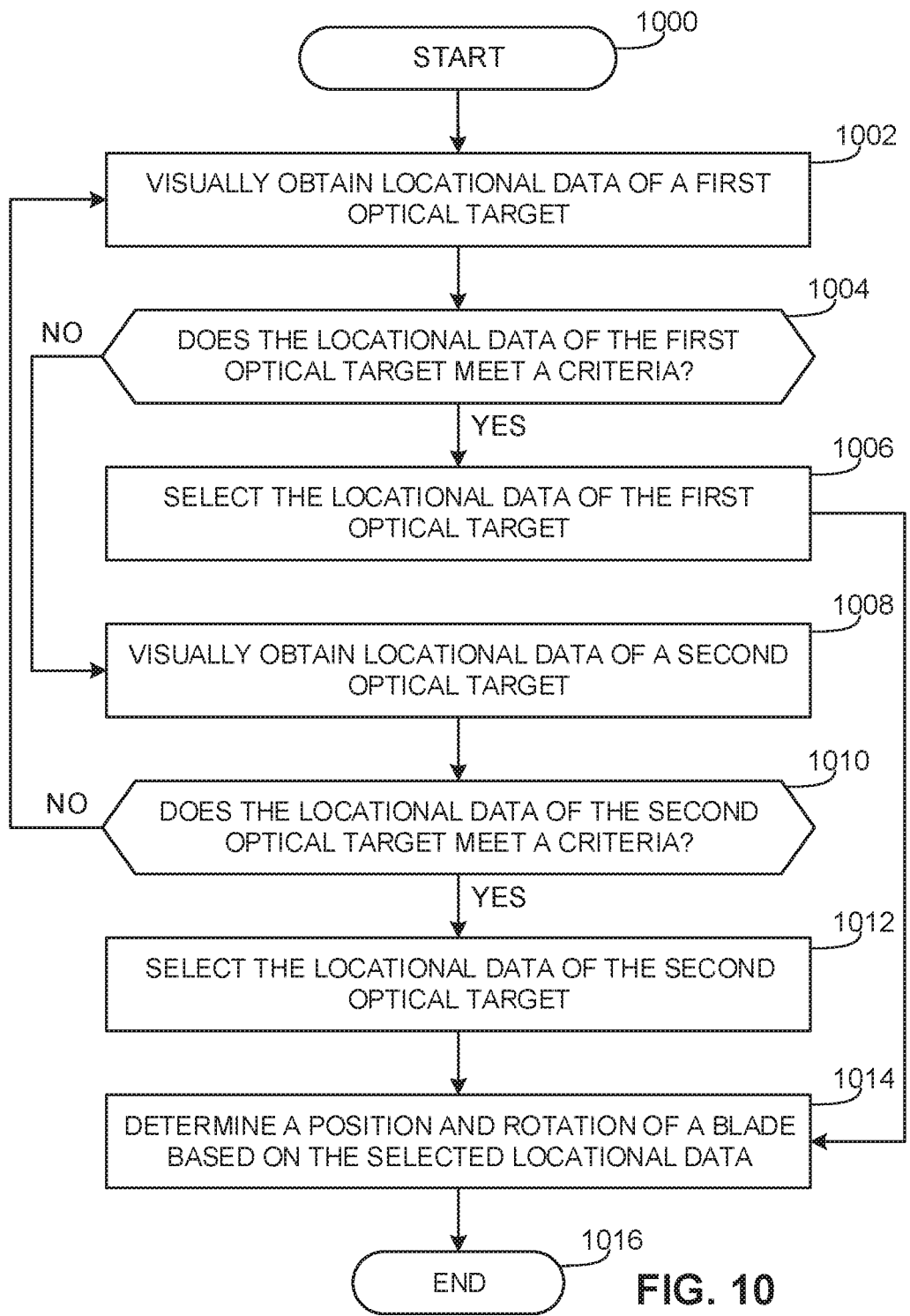
FIG. 10 is a flowchart representative of an alternative example method to process imaging data to analyze optical targets.

The example method of FIG. 10 begins at block 1000 in which the blade 102 of the working machine 100 is being used at a worksite to grade the worksite (block 1000). In contrast to the example method of FIG. 9, in this example, imaging and/or position/rotation data of the blade 102 is selected between cameras (e.g., between the cameras 202a, 202b) when a criteria/threshold has been met for a camera that is currently selected to provide locational imaging data of the blade 102. In other words, instead of continuously obtaining imaging data from both cameras and selecting a camera with a higher confidence index as shown in the example method of FIG. 9, a camera and/or associated data of the camera is, instead, selected for determining the location/orientation of the blade 102 when a condition has been met such that a criteria or threshold has been met. Alternatively, image data is continuously and/or periodically received from both cameras and both cameras are used to determine the location and rotation of the blade 102 (e.g., a blade location/rotation is determined based and/or weighted on confidence levels of each camera).

Locational data of a first optical target is visually obtained (block 1002). In particular, a camera of the illustrated example is used to obtain visual data of the first optical target, which includes an array of shapes arranged in rows.

Next it is determined whether the locational data of the first optical target meets a criteria (block 1004). If the locational data meets the criteria (block 1004), control of the process proceeds to block 1006, where the locational data of the first optical target is selected for location/orientation determinations of the blade 102 (block 1006) and the process then proceeds to block 1014. Otherwise, the process proceeds to block 1008.

If the locational data corresponding to the first optical target does not meet the criteria (block 1004), locational data associated with a second optical target is visually obtained (block 1008). In particular, imaging data associated with a camera that corresponds to the second optical target is selected and/or obtained. In some examples, the camera is instructed/prompted to provide the locational data.

According to the illustrated example, it is then determined whether the locational data of the second optical target meets a criteria (e.g., whether a calculated confidence index number exceeds a threshold, etc.) (block 1010). In this example, the criteria associated with the second optical target is identical to the criteria associated with the first optical target. However, in some other examples, the criteria may differ between the first and second optical targets. If the locational data meets the criteria (block 1010), control of the process proceeds to block 1012, where the locational data of the second optical target is then selected (block 1012) and the process proceeds to block 1014. Otherwise, control of the process returns to block 1002.

Next, a position and rotation of the blade is determined based on the selected locational data (block 1014) and the process ends (block 1016).

Figure 11:
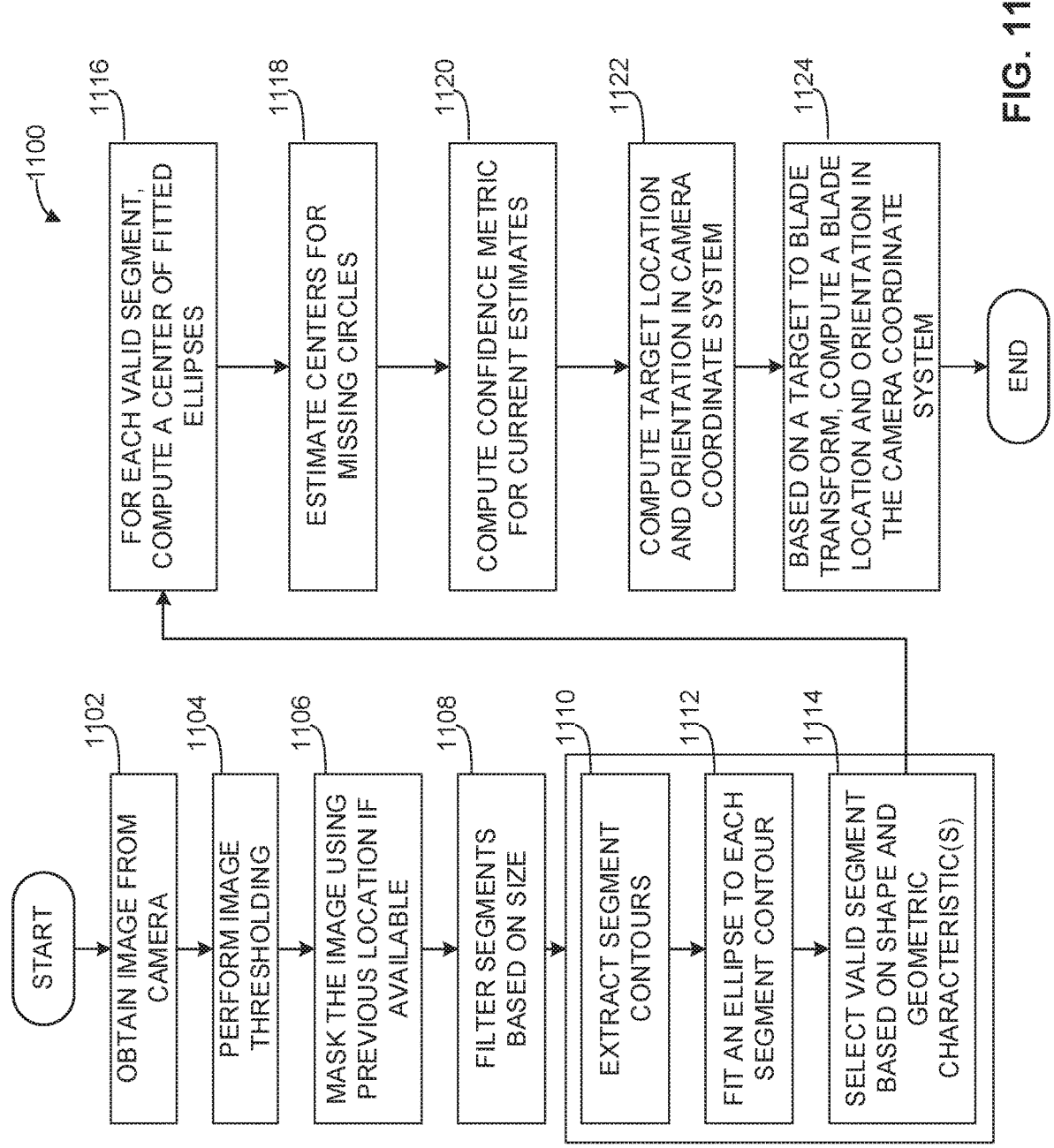
FIG. 11 is a flowchart representative of an example method to implement imaging processing in the examples disclosed herein.

The example method of FIG. 11, which may be used for image processing in the examples disclosed herein, begins at block 1100 where an optical target such as the optical target 204 is to be visually captured by the camera 202 to obtain and/or determine translation as well as rotation of the blade 102 (block 1100).

According to the illustrated example, an image from the camera 202 is obtained or received (block 1102). In particular, the camera 202 of the illustrated example provides a captured image of the optical target 204 to the imaging system 610.

Image thresholding is then performed (block 1104). In this example, image thresholding on the captured image is performed by verifying that the image meets a threshold level of clarity and/or definition. In this example, an image (e.g., a binary image) is produced when segments of the image have an appropriate intensity level (e.g., circles of a circular pattern exceed a threshold intensity level). Additionally or alternatively, the example imaging system 610 may verify that all expected patterns are present in the captured image.

In some examples, the image is masked using a previous location (e.g., if the previous location is available) (block 1106). In particular, the example tracking engine 602 and/or the position/rotation calculator 606 may mask and/or disregard portions of the image based on the previous position/location of the optical target 204 (e.g., based on previously calculated positions of the optical target 204). As a result, a reduced number of pixels of the captured image are to be used in this analysis, thereby greatly improving the computational efficiency required to analyze the optical target 104.

In some examples, segments of the image are then filtered based on size (block 1108). In particular, objects (e.g., identified objects) of the captured image that are not within a size threshold range (e.g., objects that are larger or smaller than a defined threshold range) are filtered and/or associated portions of the captured image are ignored by the example tracking engine 802, for example.

Segment contours are then extracted from the captured image (block 1110). According to the illustrated example, the position/rotation calculator 606 determines/calculates of segment contours of the example circular targets 402 described above in connection with FIG. 4 based on analyzing the captured image.

An ellipse is fitted to each segment contour (block 1112). In particular, each of the example circular targets 402 is fitted with a corresponding ellipse (e.g., a mathematical expression representing the corresponding ellipse) is generated based on the captured image.

According to the illustrated example, valid segment(s) are selected based on shape and geometric characteristics (block 1114). For example, the circular targets 402 of the optical targets 204 may be analyzed to determine whether they exhibit an appropriate "roundness" and/or circularity.

In this example, centers of respective fitted ellipses are computed for each valid segment by the example position/rotation calculator 606 (block 1116). In this example, centers of the fitted ellipses are calculated/determined using a calculated area center based on their respective shapes, as represented by the captured image.

Next, in some examples, centers are estimated for missing circles (block 1118). For example, the centers of a visible portion (e.g., one, two or three, etc.) of the six circular targets 402, for example, are calculated by the example position/rotation calculator 606 based on the captured image while a remaining portion (e.g., not visible portion) of the circular targets 402 are extrapolated/calculated based on the calculated centers (e.g., geometric centers) of the visible portion of the circular targets 402.

In some examples, confidence metrics are computed for a current estimation of centers of the circular targets (block 1120). In particular, a confidence index is calculated by the position/rotation calculator 606 based on determined confidence metrics of each of the circular targets 402.

A target location and orientation is computed in a camera coordinate system (block 1122). In this example, the position/rotation calculator 606 utilizes the calculated centers of each of the six circular targets 402 to determine a position and/or rotation of the optical target 204. In turn, the position and/or rotation of the optical target 204 is used to extrapolate a position and/or rotational displacement (e.g., in multiple degrees of freedom).

Next, a transformation (e.g., a transformation matrix) between a target and the blade 102 is used to compute the blade location and orientation in a camera coordinate system (block 1124) and the process ends (block 1126). For example, the calculated target location and orientation in the camera coordinate system may be converted to a target location and orientation in a vehicle (e.g., working machine) coordinate system. Additionally or alternatively, the calculated target location and orientation is converted/transformed into a global coordinate system (e.g., a GPS/global coordinate system) or a work site coordinate system (e.g., a local coordinate system). In some examples, once the blade location/orientation is computed in the camera coordinate system, an actuator is used to control/displace the blade 102 based on the computed location/orientation.

Figure 12:
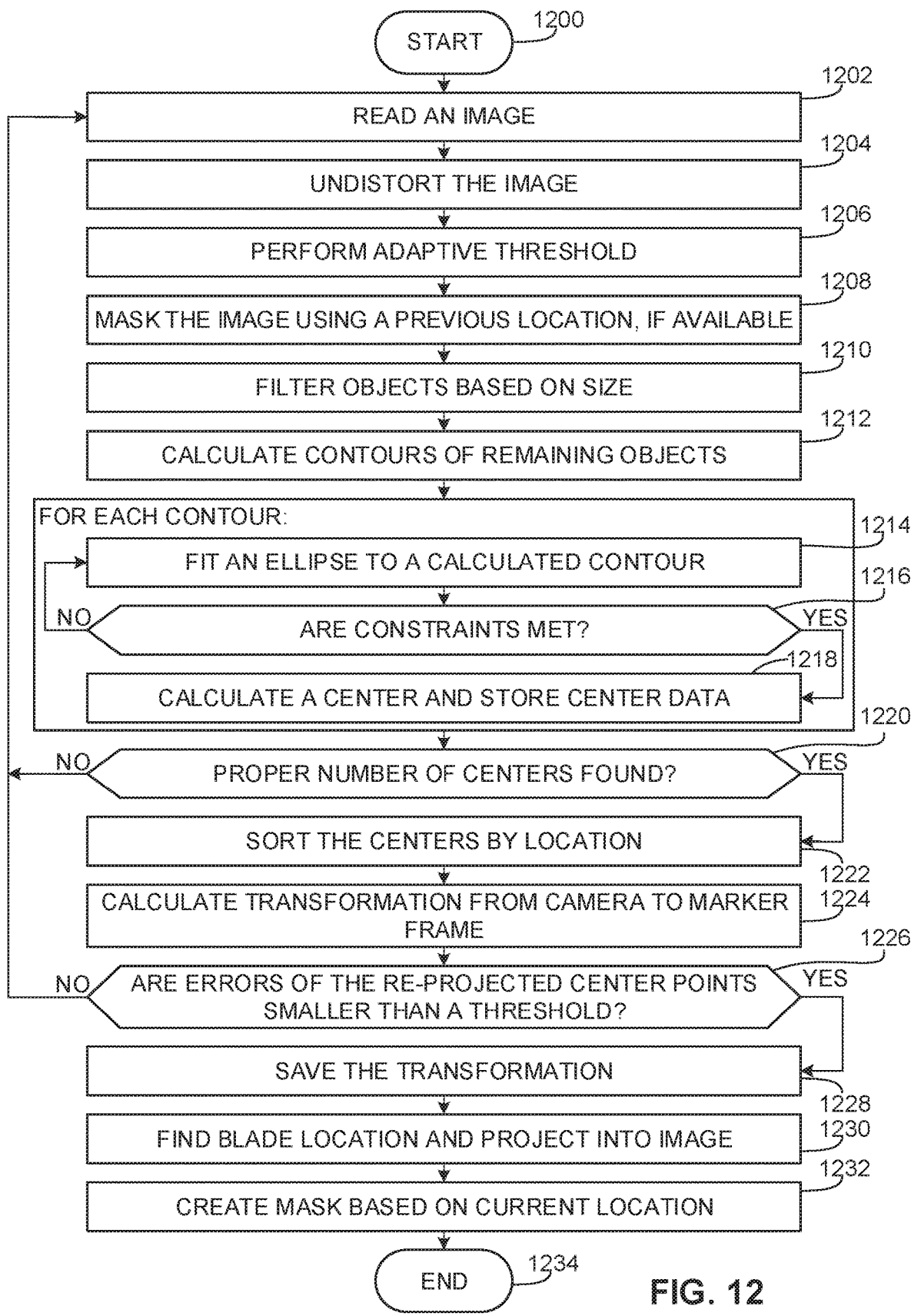
FIG. 12 is a flowchart representative of another alternative example method to implement imaging processing in the examples disclosed herein.

FIG. 12 is a flowchart representative of another alternative example method to implement image processing in the examples disclosed herein. The example method of FIG. 12 begins at block 1200 in which the circular targets 402 of the optical target 204 are to be used to determine a position/orientation of the optical target 204 and, thus, the blade 102 (block 1200). In this example, the selector 604 has selected the camera 202 to be used for determining the position and/or rotation of the blade 102.

According to the illustrated example, a new image is read, captured and/or generated by the camera 202 (block 1202). For example, at least one camera 202 generates an image of the optical target 204 when the optical target 204 is within a field of view of the at least one camera 202. In particular, the captured image includes visual representations/objects of the six circular targets 402, for example.

In some examples, the image captured by the camera 202 is undistorted (block 1204). For example, numerous imaging filters and/or enhancing techniques may be used to reduce distortion of the captured image and/or effects of environmental distortion (e.g., dust and/or shadows obscuring the captured image of the optical target 204).

In some examples, an adaptive threshold technique is applied to the captured image (block 1206). For example, the applied adaptive threshold technique may be block-based.

In some examples, the captured image is masked using a previous location (block 1208). In particular, portions of the captured image are masked based on the previous location of the optical target 204 and/or the circular targets 402.

In this example, objects (e.g., visible discrete elements) of the captured image are filtered based on size (block 1210). In particular, objects and/or portions of the captured image may be designated not to be analyzed (e.g., designated to be ignored) based on object size. Additionally or alternatively, color, a pattern of objects, etc. may be used to filter the objects and/or the portions of the captured image related to the objects.

According to the illustrated example, contours of remaining objects are calculated (block 1212). In this example, contours of the circular targets 402, which are objects that are not filtered out of the captured image in block 1210, are determined/captured. For example, the example imaging system 610 may capture an outline of the optical target 204 (e.g., the rectangular outer shape of the optical target 204) and uses the outline to generate coordinate clouds and/or mathematical functions representing the outline. Additionally or alternatively, other shapes, reticles and/or indicators (e.g., characters) are captured by the imaging system 610. In some examples, contours of other visual objects (e.g., besides the circular targets 402) are determined and/or captured.

For each of the aforementioned calculated contours, a respective ellipse is fitted (block 1214). In particular, the imaging system 610 of the illustrated example fits an ellipse and/or a calculated mathematical expression of an ellipse to each detected circular target 402 of the optical target 204.

In some examples, it is determined whether constraints are met for each of the contours (block 1216). For example, the position/rotation calculator 606 may determine whether the ellipses corresponding to each of the circular targets 402 meet a size criteria and/or a shape criteria. Some example constraints/criteria include, but are not limited to, a contour length, a contour area, a difference between major and minor axes of an ellipse, a difference in arear between an ellipse and a contour and/or circularity. Additionally or alternatively, the position/rotation calculator 606 and/or the selector 604 determine whether a correct number of contours (e.g., six for the optical target 204) have been detected in the captured image. If it is determined that the constraints are met (block 1216), control of the process proceeds to block 1218. Otherwise, control of the process returns to block 1214.

According to the illustrated example, for each of the contours, centers are calculated and stored (block 1218). First, the fiducial centers are located in the image. In some examples, the image is undistorted based on the previously established camera calibration. The undistorted image may be made binary with a Sauvola-based adaptive threshold based on pixel blocks. In some examples, size(s) of the blocks may be specified in a parameter file. In the illustrated example of FIG. 12, binary objects smaller or larger than a threshold size range (e.g., an expected threshold size range) are removed and the image is inverted to remove holes in objects that are below a given threshold. In this example, the contours of the remaining objects (after the binary objects are removed) are computed, and for each contour, an ellipse is fit to contour data points based on a least-squared solution, for example. In turn, the contours are then filtered by a set of parameters including, but not limited to, contour area, contour length, a difference between a major and a minor axis of the fit ellipse, a difference between an ellipse area and a contour area, and/or circularity of the contour. In some examples, if certain conditions are met, a center is computed based on an average of the ellipse center and/or a center of mass/area/volume of the object. This center may be stored as one of the six fiducial centers, for example. In some examples, once all contours have been analyzed, if six centers are found, center tracking is deemed successful, for example.

In this example, it is determined whether a proper number of centers (e.g., six centers) of the circular targets 402, for example, have been detected and/or calculated (block 1220). For example, the position/rotation calculator 606 may be used to determine whether the six fiducial centers have been imaged by the camera 202 or calculated/determined based on the captured image from the camera 202. If the proper number of calculated centers have been determined (block 1220), control of the process proceeds to block 1222. Otherwise, control of the process returns to block 1202.

Next, in some examples, the calculated centers of the illustrated example are sorted by location (block 1222). In particular, the fiducial centers are of the circular targets 402 are sorted by location that correspond with real-world fiducial center points. In some examples, the fiducial center coordinates are also shifted based on a center of a camera reference frame.

According to the illustrated example, a transformation (e.g., a transforming array) is calculated from a camera reference frame to a marker reference frame (block 1224). For example, a geometric transformation between a camera reference frame and a fiducial reference frame is computed/determined by the position/rotation calculator 606. In particular, the computation may use camera calibration parameters to account for radial and tangential lens distortion in conjunction with a homography, which is a linear map from one projective reference frame to another and defined by a relationship between image points and real-world points, for example. This portion of the example method may be similar to example method for calibration of the camera described above in connection with FIGS. 5A and 5B, in which a three-dimensional rotation and translation is calculated such that a matrix transformation from the real-world reference frame to the camera reference frame is defined.

It is then determined whether errors of the re-projected center points are smaller than a threshold (block 1226). Once the aforementioned transformation has been computed, the fiducial centers are re-projected back into the image pixel frame based on the transformation. This may accomplished using the camera matrix, P, which is defined by Equation 4 below:

$$s \begin{pmatrix} x_i \\ y_i \\ 1 \end{pmatrix} = KK(R \mid t) \qquad (4)$$

Therefore, the re-projected pixel locations of the fiducial centers can be expressed as the following Equation 5 below:

$$s \begin{pmatrix} x_i \\ y_i \\ 1 \end{pmatrix} = P \begin{pmatrix} x_w \\ y_w \\ z_w \\ 1 \end{pmatrix} \qquad (5)$$

As a result, the arbitrary scale factor can be removed by normalizing the resulting pixel location (through dividing $x_i$ and $y_i$ by s).

According to the illustrated example, the difference between the pixel center points and the corresponding re-projected center points is computed and if the largest re-projection error is less than three pixels, for example, the transformation is deemed to be sufficiently accurate and is, thus, stored and control of the process proceeds to block 1228. If the errors of the re-projected center points are not smaller than the threshold (block 1226), control of the process returns to block 1202.

In this example, the transformation is saved/stored (block 1228).

In some examples, a location of the blade 102 is determined/calculated and projected onto the captured image (block 1230).

According to the illustrated example of FIG. 12, a mask is created based on the current determined location of the circular targets 402 and/or the optical target 204 (block 1232). In particular, when the example method of FIG. 12 proceeds to a next image (e.g., during an additional analysis cycle of the target 204), a previous fiducial location is taken into account when searching for a next fiducial. To accomplish this, a mask may be placed onto the current capture image before thresholding that will "black out" pixel data outside of a region of interest. In such examples, a size of the mask is determined by a size of the previous fiducial in the image such that the fiducial that is further away from the mask will be relatively smaller. In these examples, if less than six fiducial centers are discovered in the current image, the example method of FIG. 12 will not use a mask and will search/analyze the entire captured image instead.

Figure 13:
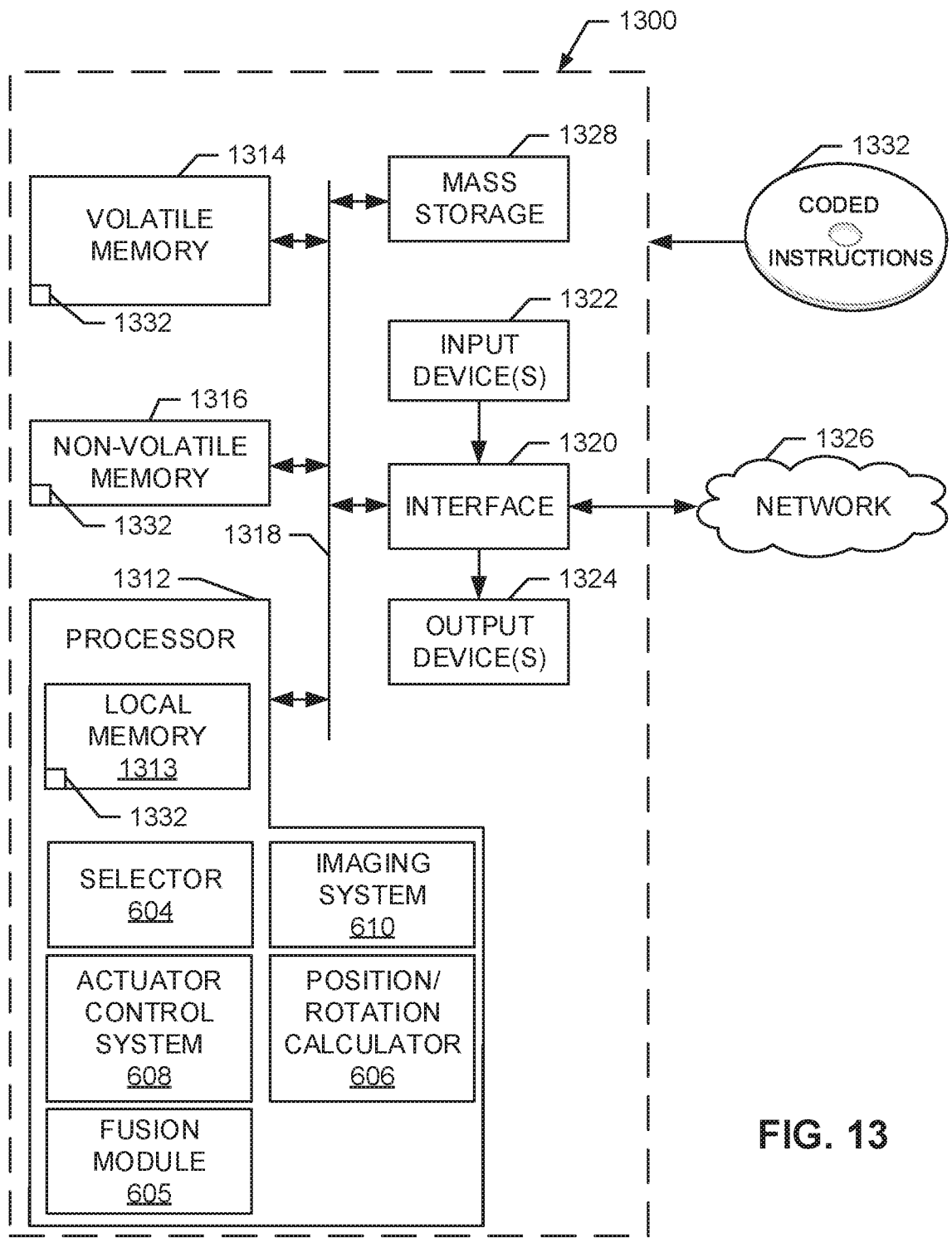
FIG. 13 is a block diagram of an example processor platform capable of executing machine readable instructions to implement the example methods of FIGS. 9-12.

FIG. 13 is a block diagram of an example processor platform 1300 capable of executing the instructions of FIGS. 9-12 to implement the displacement detection analysis system 600 of FIG. 6. The processor platform 1300 can be, for example, a server, a personal computer, a mobile device (e.g., a cell phone, a smart phone, a tablet such as an iPad™), a personal digital assistant (PDA), an Internet appliance, a digital video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 also includes the example tracking engine 602, the example selector 604, the example fusion module 605, the example position/rotation calculator 606, the example actuator system 608 and/or the example imaging system 610. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 9-12 may be stored in the mass storage device 1328, in the volatile memory 1314, in the non-volatile memory 1316, and/or on a removable tangible computer readable storage medium such as a CD or DVD.

Figure 14:
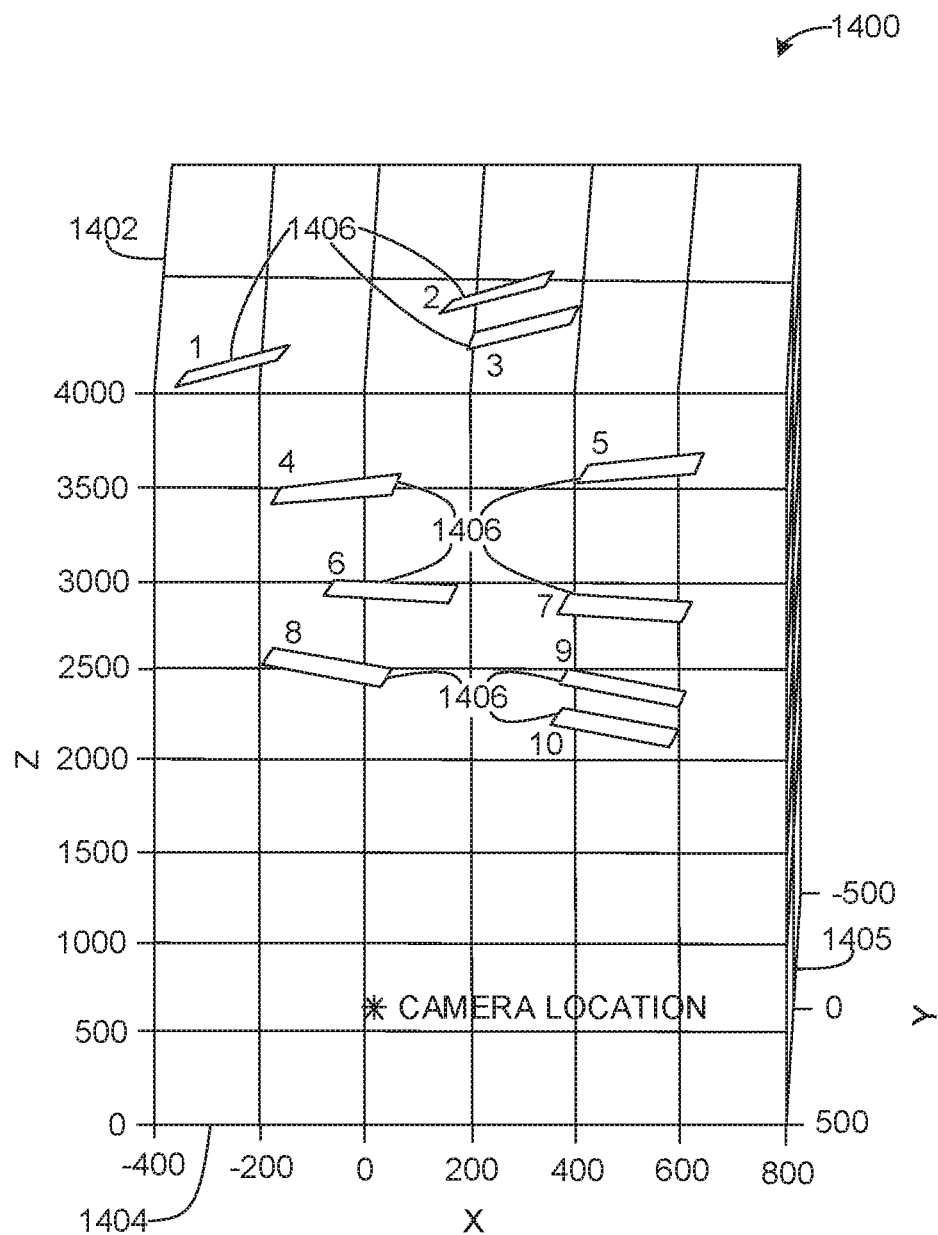
FIG. 14 is an example graph that is representative of resultant accuracy of the examples disclosed herein.

Turning to FIG. 14, an example graph 1400 that is representative of accuracy of the examples disclosed herein is shown. In particular, the example graph 1400 depicts a verification of the accuracy of the examples disclosed herein. In the illustrated view of FIG. 14, axes 1402, 1404, 1405 represent coordinate positions of three orthogonal directions, which are denoted as "X," "Y" and "Z," respectively. In this example, contours 1406 represent three-dimensional error ranges of multiple fiducial centers (i.e., fiducial centers 1-10). As depicted in the graph 1400, error ranges of all ten of the fiducial centers were determined to be within approximately 3-10 mm while a blade to which the fiducial centers were coupled to include a size of several meters/feet. In contrast, conventional systems offer an accuracy of approximately 30 mm.

From the foregoing, it will be appreciated that the above disclosed methods and apparatus enable a cost-effective solution to accurately track/monitor a position and/or orientation of a blade or other working implement of a vehicle (e.g., a working machine). In particular, the examples disclosed herein provide accurate positional/rotational tracking of a working implement that can be performed in a very quick and efficient (e.g., computationally efficient) manner being highly cost-effective.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the example disclosed herein are shown with respect to vehicles and/or working machines, the examples disclosed herein may be applied to any application with a working implement that is moved in multiple degrees of freedom.

What is claimed is:

1. An apparatus comprising:
   a blade that is pivotable;
   first and second optical targets operatively coupled to the blade;
   a first camera for collecting first imaging data of the first optical target within a first field of view, the first camera associated with a first estimation confidence engine to determine a first confidence factor of the first imaging data based on a frame-to-frame differential of shape locations of the first imaging data;

a second camera for collecting second imaging data of the second optical target within a second field of view, the second camera associated with a second estimation confidence engine to determine a second confidence factor of the second imaging data based on a frame-to-frame differential of shape locations of the second imaging data; and a processor to:
  combine the first and second imaging data based on the first and second confidence factors to define weighted combined imaging data; and
  determine an orientation of the blade based on the weighted combined imaging data.

2. The apparatus as defined in claim 1, wherein the first and second imaging data are to be collected mutually exclusive of one another.

3. The apparatus as defined in claim 1, further including a controller to control at least one of a position or the orientation of the blade based on a grading plan.

4. The apparatus as defined in claim 1, wherein at least of the first or second optical targets includes an array of shapes arranged in a pattern.

5. The apparatus as defined in claim 4, wherein the array of shapes includes a plurality of circles.

6. The apparatus as defined in claim 5, wherein the plurality of circles includes six circles arranged in two rows of 3 circles.

7. The apparatus as defined in claim 1, wherein the first optical target is disposed on a first side of a pivot of the blade, and wherein the second optical target is disposed on a second side of the blade opposite the first side.

8. A method comprising:
  measuring, via first and second cameras, first and second imaging data of first and second optical targets, respectively, the first and second optical targets operatively coupled to a blade that is pivotable;
  determining, via instructions executed by a processor, first and second confidence factors of the first and second imaging data, respectively, the first confidence factor based on a frame-to-frame differential of shape locations of the first imaging data, the second confidence factor based on a frame-to-frame differential of shape locations of the second imaging data;
  combining, via instructions executed by the processor, the first and second imaging data based on the first and second confidence factors to define weighted combined imaging data;
  determining, via instructions executed by the processor, a position and an orientation of the blade based on the weighted combined imaging data; and
  controlling, via instructions executed by the processor, the blade based on the position and the orientation of the blade.

9. The method as defined in claim 8, wherein determining the position and the orientation of the blade includes utilizing a transform of the weighted combined imaging data.

10. The method as defined in claim 8, wherein measuring the first and second imaging data includes analyzing at least one captured image including an array of shapes having a plurality of circles.

11. The method as defined in claim 10, wherein the plurality of circles includes six circles arranged in two rows of 3 circles.

12. A tangible non-transitory machine readable medium comprising instructions, which when executed, cause a processor to at least:
  determine first and second confidence factors of first and second imaging data, respectively, of a first optical target and a second optical target, the first and second imaging data measured by first and second cameras, respectively, wherein the first and second optical targets are operatively coupled to a blade that is pivotable, the first confidence factor based on a frame-to-frame differential of shape locations of the first imaging data, the second confidence factor based on a frame-to-frame differential of shape locations of the second imaging data;
  combine the first and second imaging data based on the first and second confidence factors to define weighted combined imaging data;
  determine a position and orientation of the blade based on the weighted combined imaging data; and
  control movement of the blade based on the determined position and orientation.

13. The non-transitory machine readable medium as defined in claim 12, wherein the instructions cause the processor to control the movement of the blade further based on a grading plan.

14. The machine readable medium as defined in claim 12, wherein the first and second optical targets each include an array of shapes.

15. A vehicle comprising:
  a working implement pivotable and movable in multiple degrees of freedom;
  first and second optical targets operatively coupled to the working implement, the first and second optical targets each including an array of a plurality of circles arranged in a pattern;
  a first camera for collecting first imaging data of the first optical target;
  a second camera for collecting second imaging data of the second optical target; and
  a processor to:
    determine a first confidence factor of the first imaging data based on a frame-to-frame differential of shape locations of the first imaging data,
    determine a second confidence factor of the second imaging data based on a frame-to-frame differential of shape locations of the second imaging data,
    combine the first and second imaging data based on the first and second confidence factors to define weighted combined imaging data, and
    determine a position and an orientation of the working implement based on the weighted combined imaging data.

16. The vehicle as defined in claim 15, further including a controller to control at least one of the position or the orientation of the working implement based on the position and the orientation of the working implement in conjunction with a determined location of the vehicle.

17. The vehicle as defined in claim 15, wherein the plurality of circles includes six circles arranged in two rows.

18. The apparatus as defined in claim 1, wherein the processor is to further calculate first and second outlines of the first and second optical targets, respectively.

19. The apparatus as defined in claim 18, wherein the processor is to further generate coordinate clouds representing the first and second outlines.

20. The apparatus as defined in claim 18, wherein the first and second outlines are used by the processor to further generate mathematical functions representing the first and second outlines.

21. The apparatus as defined in claim 1, wherein the processor is to further estimate a center of an elliptical shape of at least one of the first or second optical targets.

22. The apparatus as defined in claim 1, wherein the processor is to further determine a difference between measured pixel center points and fiducial center pixel points associated with at least one of the first or second optical targets.

23. The apparatus as defined in claim 1, wherein the processor is to further filter segments of the first and second imaging data based on a size of the first and second optical targets to define filtered first and second imaging data, and wherein the weighted combined imaging data is based on the filtered first and second imaging data.

* * * * *